US010944812B1

(12) United States Patent
Veppumthara et al.

(10) Patent No.: US 10,944,812 B1
(45) Date of Patent: Mar. 9, 2021

(54) DYNAMIC THROTTLING FOR DATA CONSENSUS GROUPS

(71) Applicant: Amazon Technologies, Inc., Seattle, WA (US)

(72) Inventors: Thomas Tarak Mathew Veppumthara, Seattle, WA (US); Divya Ashok Kumar Jain, Issaquah, WA (US); Amol Madhav Joshi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 256 days.

(21) Appl. No.: 15/993,182

(22) Filed: May 30, 2018

(51) Int. Cl.
   *H04L 29/08* (2006.01)
(52) U.S. Cl.
   CPC ...... *H04L 67/1002* (2013.01); *H04L 67/1095* (2013.01)
(58) Field of Classification Search
   CPC .... G06F 16/2379; G06F 16/27; G06F 16/273; H04L 67/1095
   See application file for complete search history.

(56) References Cited

U.S. PATENT DOCUMENTS

| 9,230,000 | B1* | 1/2016 | Hsieh | G06F 16/2379 |
| 9,703,602 | B1* | 7/2017 | Kusters | G06F 9/5011 |
| 10,614,098 | B2* | 4/2020 | Horowitz | G06F 11/2028 |

* cited by examiner

Primary Examiner — Oleg Survillo
Assistant Examiner — Christopher P Cadorna
(74) Attorney, Agent, or Firm — Knobbe, Martens, Olson & Bear, LLP

(57) ABSTRACT

Generally described, one or more aspects of the present application correspond to techniques for dynamically determining token bucket sizes for different types of transactions occurring at a node in a distributed consensus-based transaction system. For example, each node can store a number of cells, with such cells being replicated across a number of nodes. Each cell can assume various roles in consensus transactions, for example being a leader or simple juror, or being unsure of its leader's identity and requesting leadership. Each node can determine the overall number of transaction tokens that it will assign during a given time period based on the cell composition, and can allocate those tokens to a leader election token bucket and a customer traffic token bucket based on the cell composition.

19 Claims, 6 Drawing Sheets

DYNAMIC THROTTLING FOR DATA CONSENSUS GROUPS

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, setup with elastic resources so that the number of webservers streaming content to users scale up to meet bandwidth requirements during peak viewing hours, and then scale back down when system usage is lighter.

To protect customer data against failures in such elastic computing systems, among others, customer data is often replicated across different computer systems. However, creating consistent replicas of customer data across a plurality of computer systems requires additional resources and requires consensus on customer data across the plurality of computer systems. Additionally, there is increase cost and time required to provision computer systems to maintain replicas of customer data. While such systems may maintain the integrity of customer data and mitigate the risk of loss, there may be a reduction in customer experience and delay in customers obtaining their data.

DETAILED DESCRIPTION

Figure 1A:
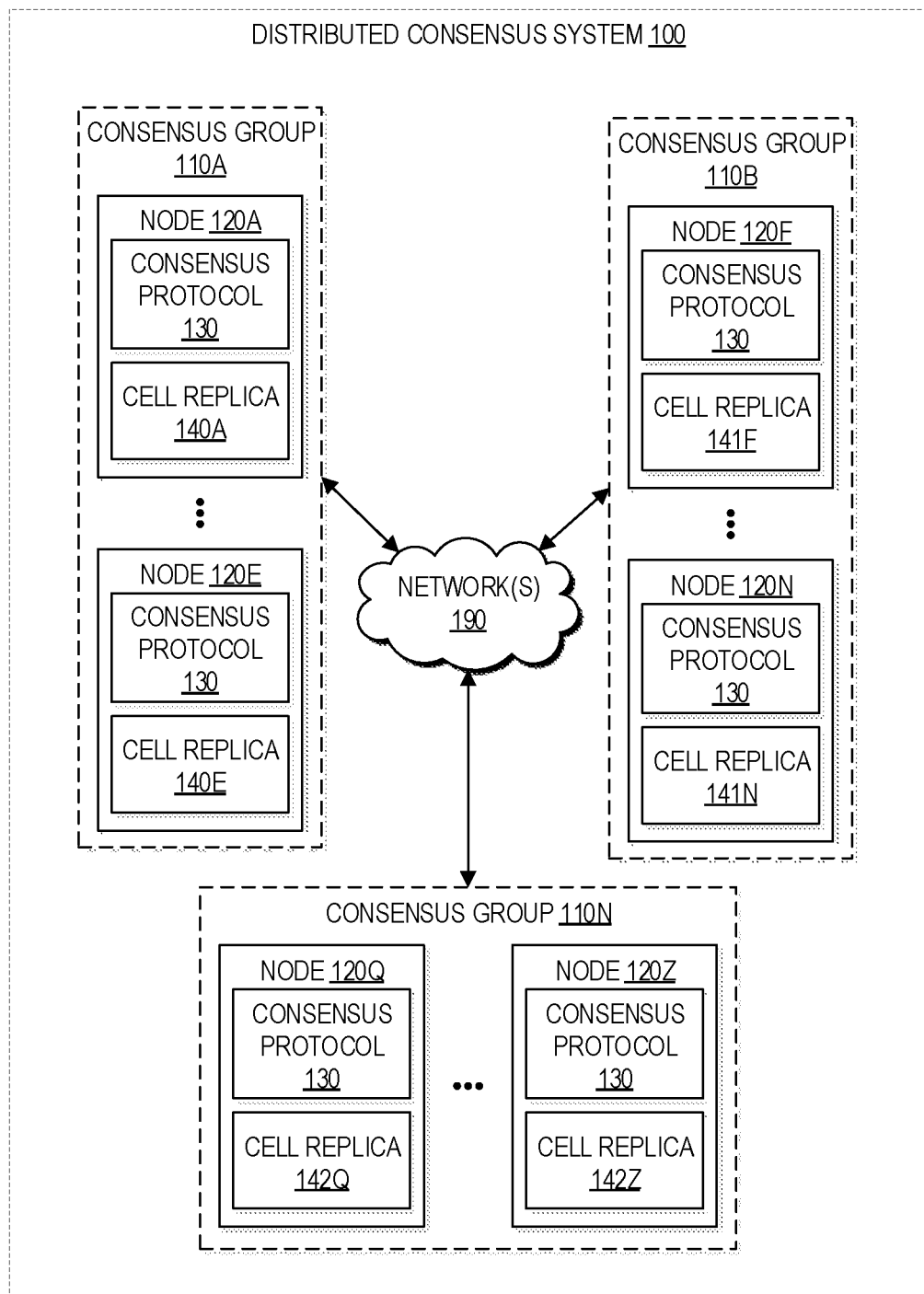
FIGS. 1A and 1B depicts schematic diagrams of a distributed consensus computing system in which various embodiments according to the present disclosure can be implemented.

Generally described, the present disclosure relates to a local mechanism for dynamically throttling traffic to a node in a distributed computing system based on the composition of cells stored at the node. For example, the distributed computing system can include consensus groups that implement a consensus protocol to maintain consistency of replicas distributed throughout the system. A node can be a host for a number of replication cells, where cells in a consensus group are distributed across different computing devices for fault tolerance. In distributed systems, hardware and software may be unreliable and fail, or network connections can experience failure. As such, distributed systems may not rely on one copy of a given resource, as that copy may become unavailable due to failure. As such, distributed systems may keep multiple copies of a given resource, with such copies being consistent in that they agree about their contents at any given point in time. Consensus protocols, including Paxos, are a mechanism based on communication between copies that enables them to maintain a consistent consensus about their contents, even in the presence of device, software, and network failures. However, certain scenarios can trigger a quantity of communications that can overwhelm a given node. The present disclosure uses the composition of cells on the node to dynamically determine token bucket sizes for various types of communications in order to mitigate or eliminate opportunities for communications to overwhelm the nodes.

In distributed computing systems, data replication can reduce the risk of failure and mitigate possible data loss in the case of system failure. For example, computing resources provisioned to customers (e.g., storage volumes, computing instances, and other types of computing resources) can be replicated for increased fault tolerance, for example as a master-slave pair. In addition, a consensus group may include a distributed storage system for storing customer data, metadata about customer data, or other data in cells replicas distributed across a plurality of physical hosts. This may reduce the risk of failure and increase availability of the consensus groups during hardware, software, or network failures. In various embodiments described herein, a consensus group maintains metadata associated with a master-slave pair, with such metadata indicating for example which replica is the master and which replica is the slave, among other types of metadata. The consensus group or another consensus group can also maintain the state of the master-slave pair, such that the master and slave can be synchronously replicated.

A consensus group can include replicated cells distributed across some number of nodes executed by one or more host computer systems, where the nodes implement a consensus protocol, such as Paxos, to enable consistent data replication between the nodes. Each node can represent a single computing device, or a single partition or container of a computing device. A particular node may contain a number of different data consensus groups. For example, each data consensus group can include a certain number of cells that are replicas of one another (e.g., seven replicas of a cell, or more or less in various implementations). Each cell can be stored on a different node, with each node storing a number of cells of different consensus groups (e.g., 5,000, or more or less in various implementations).

A consensus group has a number of participants, referred to herein as "jurors." In general, implementing the consensus protocol by a consensus group involves the election of a master cell from among the jurors of the consensus group In various protocols the master may also be referred to as a leader, proposer, distinguished leader, distinguished proposer, or other such delineation indicating the role and/or responsibility of the master (e.g., the node or cell responsible for progressing the consensus protocol). This elected master is referred to herein as the "leader." The leader can serve client requests, where a client is not part of a consensus group but rather is an external entity whose actions trigger state changes by making requests to the distributed consensus system. The leader may be a fixed entity within the consensus group for as long as it maintains its juror status within the group, or any juror that receives a client request can elect itself as leader, depending upon the implementation. When the leader receives a request from the client, the leader can initiate a consensus round to try to get a quorum of other cells to agree on the request by making a proposal. These other cells, referred to herein as "simple jurors" (e.g., non-leader jurors), are referred to as acceptors and voters in various protocols. Cells may implement a protocol referred to as a "heartbeat" by which a leader refreshes or renews its identity as leader of the consensus group. For example, a leader may be elected for a time period referred to as a "lease" and can renew its lease via the heartbeat. During the heartbeat protocol, the jurors of the group can implement an election process to figure out which juror is the leader. This heartbeat may be performed, for example, every half second (or longer or shorter time intervals in various implementations).

Once a proposal is accepted during a consensus round, a learner processes the request from the client and sends the client the result. In some implementations, the leader (the cell that initiated the proposal) can also act as the learner. Each consensus round is effectively independent, and includes a process of attempting to reach consensus across a consensus group. An example implementation of a Paxos consensus protocol in the distributed consensus system of the present disclosure is described in U.S. application Ser. No. 15/016,192, filed Feb. 4, 2016, entitled "DISTRIBUTED TRANSACTIONS ACROSS MULTIPLE CONSENSUS GROUPS," the contents of which are hereby incorporated by reference.

As described above, each node can store many cells, for example thousands, and each cell can be replicated a number of times across different nodes to form a consensus group. Because consensus protocols can require that the cells in a consensus group reach consensus before enabling reads or writes, the distributed nature of the consensus groups leads to a lot of traffic (e.g., data communication) between nodes during a given consensus round. Further, the different types of cells involve different amounts of traffic per round. For example, a leader typically does more work than a simple juror per round. Leaders and simple jurors are referred to as "leased cells" herein, signifying that they know their identity as a juror of a particular consensus group. Certain scenarios (e.g., loss of power to node hardware, loss of connection between a node and the previous master node) may result in a cell not knowing the identity of the leader of its consensus group, referred to herein as an "unleased cell." In such scenarios, the unleased cell may propose itself as the leader, triggering a consensus round with the other cells in its consensus group, or may or otherwise learn of a new leader that was elected (which may not trigger a consensus round). A producer is a cell that triggers a consensus round, for example by making a proposal.

In some implementations, any juror within a consensus group can trigger a proposal in response to receiving a client request. However, a cell in an unleased state may try proposing itself as the leader (e.g., distinguished proposer). As such, in some implementations once one of the jurors proposes themselves as a leader, unless otherwise specified the other jurors in the consensus group may reject client requests, for example if the client requests an override of this behavior (e.g., if the previous leader has not responded to the request).

Depending upon the composition of cells on a node, and the types of traffic handled or initiated by these nodes, in some scenarios the number of transactions (e.g., data communication requests) per consensus round may exceed a transaction limit of the node. To illustrate, consider the following examples. A node may have a transaction limit of several thousand transactions per second or per round, for example 2,000 transactions. If that node stores 5,000 cells and experiences power failure such that all 5,000 cells are now unleased cells that do not know their identities within their consensus groups, this may trigger a "storm" of requests to elect leaders. The number of these requests can exceed the transaction limit of the node. Due to the large volume of communications between nodes (as multiple nodes store cells in the same consensus group), the overwhelming of one node can cause downstream overwhelming of other nodes.

An overwhelmed node is a node that is attempting to handle a volume of transaction that exceeds its transaction limit. Overwhelming of a node can cause different types of unwanted behaviors/effects depending upon the type of issue and the trigger. As one example, an overwhelmed node can start taking more and more time to processes each request, increasing latency both on the client side and in responding to its peers in consensus rounds. As another example, an overwhelmed node can become unable to accept more requests and begin rejecting all requests sent to it, which the client may see as errors. Further, an overwhelmed node can crash in various ways (e.g., disk, CPU, input/output ("I/O"), or other resources) if its transaction load crosses a resource limit. For example too many requests can fill up the disk, corrupting the files on the node, thereafter rendering that node dead and unrecoverable. These behaviors can impact other nodes in the distributed consensus system due to the internode communication slowing down or erroring out. Thus this overwhelmed behavior can slowly spread to other nodes, if initially there are enough overwhelmed nodes. For a consensus group, if a majority of its cells (e.g., 4/7) are hosted on nodes that become slow or crash due to overwhelming, the consensus group will have "lost majority" and will be unable to serve customers or reach consensus on anything until the nodes recover and it regains majority. If the others never recover, that data may be lost irretrievably.

The aforementioned problems, among others, are addressed in some embodiments by the disclosed techniques for locally determining the number of different types of transactions that will be authorized at a given node during a given timeframe (e.g., a round, a second, or another suitable timeframe). The disclosed techniques can use token buckets to authorize certain transactions in a manner that throttles the overall set of requested transactions at a node to not exceed the node's transaction limit. For example, a given node can analyze its cell composition and dynamically apportion token buckets for leader election traffic and customer traffic based on the cell composition. Specifically, a ratio between a number of producers (that are proposing write traffic for a round) and a total number of cells can be used to determine a number of overall tokens that will be allotted to the node's token buckets. This number can be based on experimental tests for nodes having different compositions ranging from all leaders to all simple jurors. These token buckets can include a leader election token bucket and a customer traffic token bucket. The number of total tokens assigned to the leader election token bucket can be determined based on the ratio between unleased cells and leaders (which are the two types of producers). The number of tokens assigned to the customer traffic token bucket can be the remaining number of the overall tokens. In this way, the system gives priority to leader election, as consensus groups with no leader are not able to answer client requests.

During the given timeframe, the number of allowed transactions can be determined by granting the tokens to requesting cells. Each transaction may have a fixed or dynamically determined cost in terms of number of tokens, depending upon whether the token bucket sizes are computed dynamically (used with fixed costs) or are fixed (used with dynamically determined costs). When all tokens have been granted from a particular bucket, the node can reject additional traffic that would otherwise require tokens from that bucket until a new token becomes available. In addition, some implementations may also maintain a node limit token bucket reflecting the total determined number of transaction tokens available for the node. Each transaction (or each transaction of some particular type(s) of traffic) may additionally draw the determined number of tokens from this node limit token bucket. A rejection either from its traffic-specific token bucket or the node limit token bucket may cause the transaction to be rejected. This can beneficially ensure that the node does not exceed its overall transaction limit, even during burst scenarios for one type of traffic (e.g., for leader election traffic) where that type of traffic consumes more tokens than normally allotted to its traffic-specific token bucket.

At the cell that sent the transaction, the rejection by the node can cause an error that triggers the cell to retry the transaction after a certain interval of time. In some implementations, the leader election and customer traffic token buckets can automatically refill to the determined levels after each pre-determined time interval, for example every second. The pre-determined time interval can correspond to the time interval of the node transaction limit. To illustrate, if the node transaction limit is a certain number of transactions per second, the buckets can refill each second. The disclosed token bucket algorithm thus can be used to ensure that transactions conform to defined limits on bandwidth and burstiness (a measure of the unevenness or variations in the traffic flow). The disclosed token bucket algorithm can also be used as a scheduling algorithm to determine the timing of transmissions that will comply with the limits set for the bandwidth and burstiness.

In some implementations, certain burst scenarios (where traffic exceeds the transaction limit on a node) may be accommodated by a "burst" token bucket that allows the additional transactions during a certain timeframe with a caveat that the number of transactions in future timeframes will need to be correspondingly reduced to allow for recovery of the burst token bucket. To illustrate, consider a node with a limit of 100 transactions per second that is asked to handle 200 transactions during one second. Drawing 100 tokens from the burst token bucket may allow the node to temporarily handle 200 transactions for one second and then zero the next second (to replenish the 100 tokens to the burst token bucket), or 110 transactions for ten seconds and then 0 the next second (to replenish the 100 tokens to the burst token bucket). Each traffic-specific token bucket (e.g., a leader election token bucket, customer traffic token bucket, or token bucket for another type of traffic) can have an associated burst token bucket. The size of the burst token bucket may be equal to the size of the primary token bucket. In some cases, for example for the leader election bucket, the burst bucket might be set to some number of times (e.g., 2, 3, or more) the size of the primary token bucket when there is a low number of unleased cells, and the burst bucket size may be slowly tapered to equal to the primary token bucket size as the ratio of unleased cells to total cells increases. This can counter a slightly stale view that the throttling system might have of the cell composition, based upon the implementation. The burst token buckets can give the node leeway to react to an event, where such events typically occur on the millisecond timescale, while the transaction limit (and associated token bucket computations) may typically be performed on a second time scale.

As would be appreciated by one of skill in the art, the use of a dynamic token-based throttling scheme, with token quantities determined locally based on node cell composition, as disclosed herein, represents a significant technological advance over prior implementations. Specifically, the disclosed techniques prevent nodes from becoming overwhelmed, for example by leader election traffic such that they cannot respond to client requests, or by high volumes of customer traffic such that leaders cannot be elected to handle customer requests. Further, by dynamically apportioning token buckets for leader elections and customer traffic based on proportionality of producers in cell composition, the disclosed techniques can prioritize leader election to more quickly answer client requests, while still reserving some bandwidth for current client requests. Beneficially, making such throttling determinations locally (e.g., at the node being throttled) avoids further network traffic compared to other distributed systems for making throttling determinations. Further, the composition-based token bucket sizing allows these local decisions to succeed on a system level. For example, a leader may not have to ping the simple jurors in its group to learn whether or not they actually have capacity to handle a proposal, based on an assumption that the nodes hosting those simple jurors are also implementing the disclosed throttling techniques and thus the simple jurors will have capacity. This further reduces the network traffic within the distributed consensus system. As such, the embodiments described herein represent significant improvements in computer-related technology.

The present disclosure presents examples in the context of a leader election token bucket and a customer traffic token bucket for controlling the transaction limit of these two types of consensus system traffic. However, it will be appreciated that there are additional types of traffic within a consensus system, for example traffic from a control plane of the system. Some implementations may have additional token buckets for these additional types of traffic. A token bucket for a prioritized type of traffic, for example leader election traffic, can be computed first and assigned a first portion of the overall available tokens for a node. The remainder of the overall total can be distributed amongst additional token buckets for the additional types of traffic, for example a customer traffic token bucket and a control plane token bucket. This remainder distribution may also be based on prioritization of the additional types of traffic. Other examples may have four or more token buckets each for a different type of traffic.

Various aspects of the disclosure will now be described with regard to certain examples and embodiments, which are intended to illustrate but not limit the disclosure. For example, although the examples of the present application focus on the example of the Paxos consensus protocol, it will be appreciated that the cell-composition-based token bucket sizing can be implemented to throttle node traffic for a variety of consensus protocols. Although the examples and embodiments described herein will focus, for the purpose of illustration, specific calculations and algorithms, one of skill in the art will appreciate the examples are illustrate only, and are not intended to be limiting.

Overview of Example Computing Environment

Figure 1B:
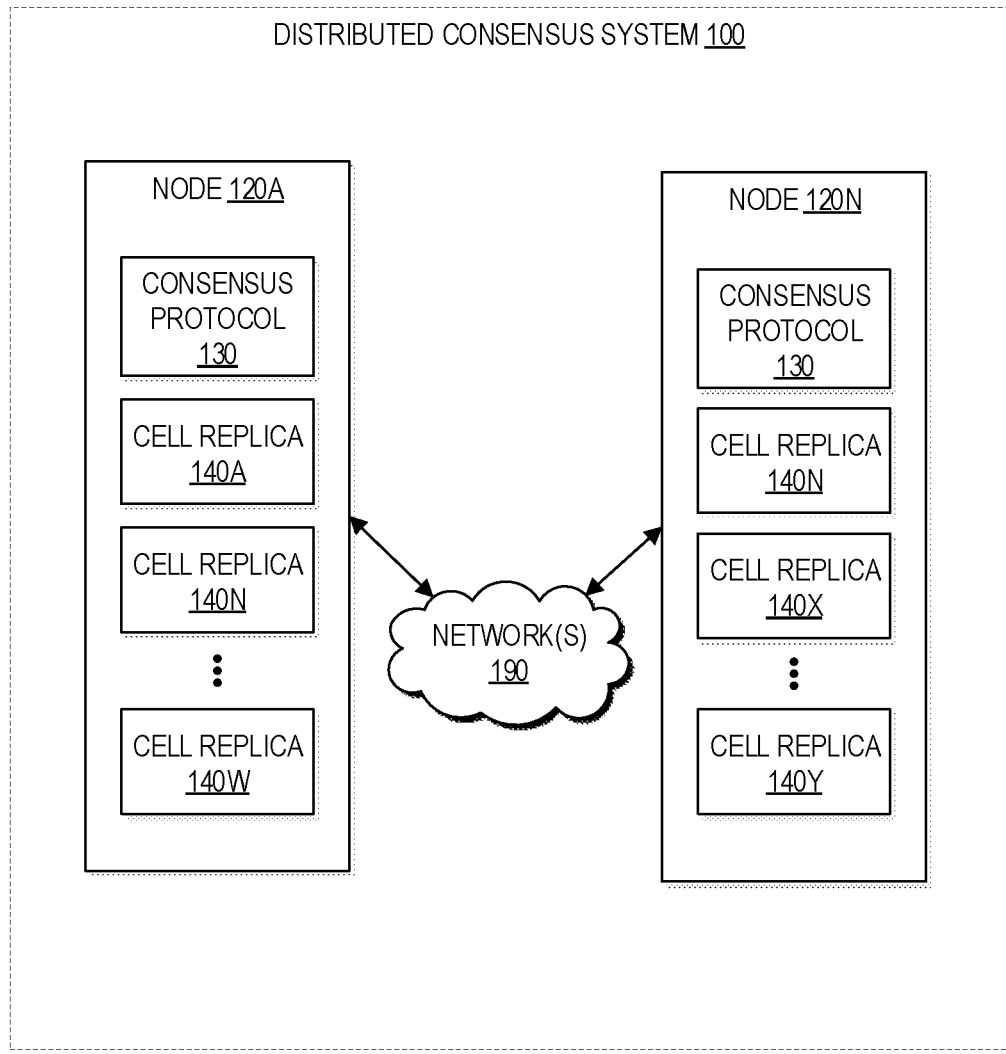

FIGS. 1A and 1B illustrate an example system environment for distributed transactions across multiple consensus groups, according to some embodiments. FIG. 1A depicts how each consensus group can include a number of nodes hosting its cells, and FIG. 1B depicts how each node may host a number of cells (including some cells being replicated across multiple nodes).

A distributed consensus system 100 may include a plurality of consensus groups, and each of the consensus groups may include a plurality of nodes hosting the cell replicas of the consensus group. As shown in FIG. 1A, for example, the distributed consensus system may include consensus groups 120A and 120B through 120N. Consensus group 120A may include a plurality of nodes, e.g., nodes 120A through 120E. Consensus group 120B may include a plurality of nodes, e.g., nodes 120F through 120N. Consensus group 120N may include a plurality of nodes, e.g., nodes 120Q through 120Z. In some embodiments, each consensus group can include seven nodes, each hosting a different one of seven replicas of the cell of the consensus group.

As shown in FIG. 1B, each node can host a number of different cell replicas, and some of these cell replicas can be replicated across nodes. In the illustrated example, node 120A hosts cell replica 140A, 140N, and 140W, among possibly others. Node 120N hosts cell replica 140N, 140X, and 140Y, among possibly others. Each node may host a number of cell replicas up to some maximum capacity, which can be hundreds or thousands of cell replicas in various implementations. Nodes may be shared among consensus groups. As shown in FIG. 1B, cell replica 140N is replicated across nodes 120A and 120N. Each cell replica may be replicated one or more times for fault tolerance. FIGS. 1A and 1B are further described together below.

It is contemplated that the distributed consensus system 100 may include any suitable number of consensus groups and any suitable number of host nodes within any particular group. The distributed consensus system 100 may be implemented using one or more computing devices, any of which may be implemented by the example replication management server 510 illustrated in FIG. 5, or another suitable computing device. In various embodiments, portions of the functionality of the distributed consensus system 100 (e.g., multiple hosts) may be provided by the same computing device or by any suitable number of different computing devices. In one embodiment, a node may represent a set of one or more processes configured for communicating with other nodes and for performing transactions. If any of the components of the distributed consensus system 100 are implemented using different computing devices, then the components and their respective computing devices may be communicatively coupled, e.g., via one or more networks 190. Each of the illustrated components may represent any combination of software (e.g., computer-executable instructions) and hardware (e.g., data storage devices, processing devices) usable to perform their respective functions. It is contemplated that the distributed consensus system 100 may include additional components not shown, fewer components than shown, or different combinations, configurations, or quantities of the components shown.

The nodes may also be referred to as distributed nodes, the consensus groups may also be referred to as groups or replication groups, and the set of groups may also be referred to as a mesh. A node within a group may be referred to as a member of that particular group. In some implementations, the mesh may include thousands of groups. Each group may store a plurality of replicas of a resource, such as a processing resource (e.g., a computing instance) or a storage resource (e.g., a volume in a block-based storage system), or may store metadata about such a resource. A replica may represent client data or metadata about client data, potentially including volume data and/or volume metadata. Typically, each node in a group may store one replica. As shown in the example of FIG. 1A, the nodes 120A-120E within consensus group 110A may store cell replicas 140A-140E, respectively; the nodes 120F-120N within consensus group 110B may store cell replicas 141F-141N, respectively; and the nodes 120Q-120Z within consensus group 110N may store cell replicas 142Q-142Z, respectively. The cell replicas may be maintained in any suitable type of storage, such as persistent storage managed locally by a host or accessible by the host over a network. In the distributed consensus system 100, different consensus groups may be dedicated to storing and maintaining different types of data. For example, the replicas 140A-140E may differ from the replicas 141F-141N and 142Q-142Z in the nature of the data or in the portion of a larger data set that they represent. Distributed transactions performed in the distributed consensus system 100 may store or update a replicated resource (as managed by the nodes) within one or more of the consensus groups.

The nodes themselves may experience failures or otherwise become unresponsive, or communication between one node and another node may experience a failure. The distributed consensus system 100 may seek to achieve the properties of atomicity, consistency, isolation, and durability (i.e., "ACID") for individual transactions, even in an environment where failures of individual nodes may occur. Even if some nodes fail or become unresponsive, the distributed consensus system 100 may also allow progress to occur (e.g., to move from one transaction to the next).

Each of the nodes in the distributed consensus system 100 may implement a consensus protocol 130. The consensus protocol 130 may be used by the nodes to agree on one transaction to be performed by one or more of the consensus groups. Different transactions may involve different combinations of the groups, from one of the groups to two of the groups to potentially all of the groups. For a transaction to be chosen and performed, a majority of the nodes in each of the groups involved in the transaction may use the consensus protocol 130 to agree to the transaction. If a second transaction is proposed to group B but not to group A during the same round, then group B may be expected to choose one of the two transactions; if a majority of the nodes in group B choose the second transaction over the first transaction, then the first transaction may fail to proceed even though group A was not involved in the second transaction.

The consensus protocol 130 may guarantee that, within a group, only a transaction that has been proposed may be chosen. The consensus protocol 130 may also guarantee that, within a group, only a single transaction is chosen for any given round. Additionally, the consensus protocol 130 may guarantee that a process never learns that a transaction has been chosen unless it actually has been chosen. A group is involved in a transaction if the proposer of the transaction attempts to propose the transaction to at least one member of the group.

In one embodiment, the consensus protocol 130 may comprise a version of a protocol from the Paxos family of protocols. The Paxos consensus protocol may include a family of different protocols configured to solve consensus issues in a network of unreliable processors (e.g., computer systems and networks that are subject to possible failures). The Paxos consensus protocol ensures agreement on one result and/or one operation among a group of participants, for example, the nodes of the consensus groups 110A-110N. Using the techniques described herein, the distributed consensus system 100 may implement token-based throttling in conjunction with the Paxos protocol to avoid overwhelming individual nodes while ensuring the properties of atomicity, consistency, isolation, and durability. The distributed consensus system 100 may do so without the use of a centralized manager component (e.g., external to the nodes) for coordinating the activities of the nodes or monitoring the state of distributed transactions. Any of the distributed nodes may be configured to perform tasks such as proposing a transaction (e.g., to act as a proposer), accepting a proposed transaction (e.g., to act as a simple juror), and performing tasks (e.g., storage tasks or database tasks) required to complete a transaction.

In a typical, single-group Paxos implementation, the first phase of a transaction may include the following steps: (a) a proposer selects a proposal number n and sends a prepare request with that number n to a majority of jurors within a group; and (b) if a juror receives a prepare request with number n greater than that of any prepare request to which it has already responded, then it responds to the request with a promise not to accept any more proposals numbered less than n and with the highest-numbered proposal (if any) that it has accepted. In a typical, single-group Paxos implementation, the second phase of a transaction may then include the following steps: (a) if the proposer receives a response to its prepare requests (numbered n) from a majority of jurors, then it sends an accept request to each of those jurors for a proposal numbered n with a value v, where v is the value of the highest-numbered proposal among the responses, or is any value if the responses reported no proposals; and (b) if a juror receives an accept request for a proposal numbered n, it accepts the proposal unless it has already responded to a prepare request having a number greater than n. To learn that a value (e.g., a transaction) has been chosen, a learner must find out that a proposal has been accepted by a majority of jurors. Each juror, whenever it accepts a proposal, may respond to all learners by sending them the proposal. A value that is accepted by majority can be learned as chosen and may not change or get lost.

From the perspective of a group in a typical, single-group Paxos implementation, as long as no majority has accepted a value while in the proposing state, any value can be accepted by any member of the group. But once majority of the group has accepted a value, no new values can be proposed and accepted by any member of the group. From the perspective of a value in a typical, single-group Paxos implementation, any value that is proposed in the group in a proposal can be either committed or aborted. Once the proposed value is accepted by majority of the group, it is ensured to be committed and cannot be aborted. On the other hand, if a proposed value is only accepted by minority and is not able to be accepted by majority (i.e., the majority has accepted other value), it is ensured to be aborted (i.e., its value will not be learned/committed by anyone in the group). Once a majority of jurors have accepted a same value, no other values can be accepted by majority; the group is locked by a value accepted by the majority. Once a majority of jurors have accepted a same value with number n, then n is the highest number known to the group; the group can only be locked by the highest numbered value. The learning may ensure the termination: once a value is accepted by the majority of jurors, that value can be learned as chosen; once the group is locked, it is ensured to be committed and terminated.

The distributed consensus system 100 may extend such a single-group Paxos protocol to a multi-group consensus protocol 130 that may be implemented by the hosts in the plurality of consensus groups 110A-110N. As used herein, the term "round" may refer to the life cycle of a consensus on choosing one value or update. As used herein, the term "group" or "consensus group" may refer to a group of processes that run the consensus protocol 130. Each member of the group may hold one replica of the data that the group is responsible for storing. If P is such a group, then P={N1, N2, N3, . . . }, where N1, N2, N3, . . . are the members of the group P. As used herein, the term "transaction group" may be a group of groups. A transaction group may define the scope of each transaction.

The distributed consensus system 100 may be implemented with the assumption that each group member is aware of all members of the group. The distributed consensus system 100 may also be implemented with the assumption that a proposer knows all members of all groups for a transaction that it is trying to propose. Additionally, the distributed consensus system 100 may be implemented with the assumption that membership of each group does not change during a round. Some proposals can be used to change the membership of the group for future rounds.

Figure 2:
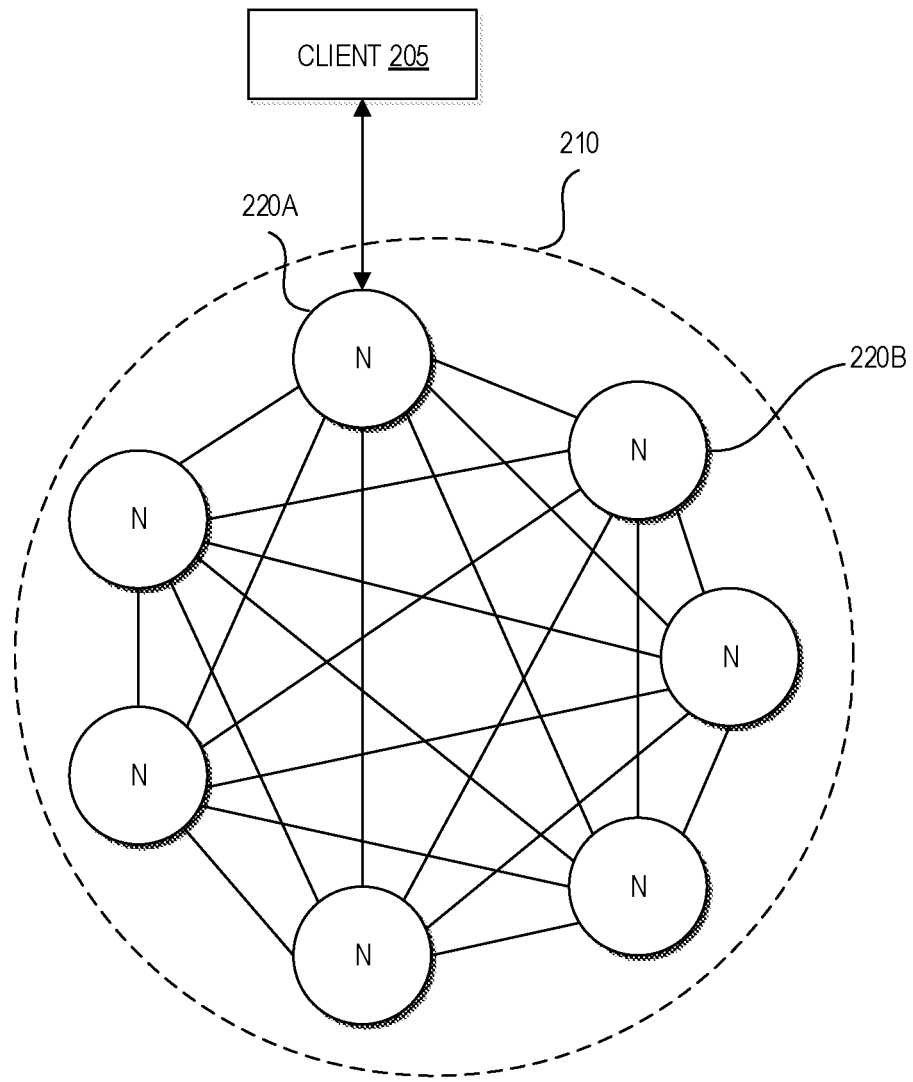
FIG. 2 depicts a schematic representation of the nodes of a consensus group of the distributed consensus computing system of FIGS. 1A and 1B.

FIG. 2 depicts a schematic representation of the nodes N of a consensus group 210 in communication with a client 205. The consensus group 210 may be any of the consensus groups 110A, 110B, 110N of the distributed consensus system 100, and the nodes N may be the corresponding nodes of the group. The nodes N of the consensus group 210 may store copies or replicas of data (referred to herein as "cells") so as to provide redundancy in the event of the loss of some number of the nodes N. Although shown with an example of seven nodes (corresponding to seven cells in a consensus group), the number of nodes N of a given consensus group 210 can be selected such that the probability of a majority of the nodes failing is below some threshold. Each node N can be software or other executable code maintained in the memory of a physical host (e.g., a server computer system) in order to provide the functionality described herein. Typically, each node N may be executed by one or more distinct physical hosts, although in some embodiments some of the nodes N in a consensus group may be co-located on the same physical host.

A client 205, which may include a computer system under the control of a customer of the computing resource service provider and/or application or other executable code executed by one or more other computer systems or services of the computing resource service provider, may issue requests to the consensus group 210 and wait for a response. For example, the client 205 may include a customer transmitting a storage request to an interface of a replication service hosting the consensus group 210. The interface may include a web-services front end or other computer system interface configured to receive an application program interface (API) request and process the API request and/or direct the API request to an appropriate computer system or service for processing. In another example, the client may include another service of the computing resource service provider issuing a request to store state information of the other service on behalf of a customer.

At least one node N, here designated as node 220A, can be the leader of the consensus group 210 and can interface with the client 205. In some implementations, the leader can be any of the nodes N, selected to handle a particular incoming request from the client 205 based on a variety of criteria. In other implementations, a single node N can be elected as leader and can remain the leader until failure. In some implementations, the only time other nodes send proposals is when the current leader fails and a new one needs to be elected to handle requests from the client 205. In some implementations, the client can propose using any of the other jurors in certain situations. For example if the client contacts the leader and it fails a certain number of times, the client may be configured contact another juror and ask it to propose even though it is not the leader. The remaining nodes 220B can be simple juror nodes, and can operate to provide consensus upon particular transactions.

The nodes 220B and the leader node 220A can be connected (illustrated as lines between the nodes in FIG. 2) through various network connections, for example network(s) 190. The network connection may be provided by various network devices, physical hosts, and other computer systems. For example, the physical hosts executing the nodes N may include at least a virtualization layer and a network interface to enable the nodes to send and receive network traffic. Furthermore, the nodes 220B and the leader node 220A may be distributed across physical hosts and networks such that failure of one or more networks or physical hosts does not cause all of the nodes N of the consensus group 210 to fail.

The consensus group 210 may further include software or other executable code configured to manage the operation of the consensus group 210, nodes 220B, and/or leader node 220A. Managing the operation of the consensus group 210 may include creating new nodes, replacing failed nodes, providing discovery of nodes, backing up data maintained by the nodes, determining roles of the consensus protocol to be performed by the nodes, selecting a leader, and other such operations as required to ensure the functioning of the consensus group 210. In various embodiments, the leader node 220A executes the leader role, as described above, of the Paxos consensus protocol. Furthermore, the leader node 220A may ensure progress towards eventually consistent data storage and reads from the various nodes N of the consensus group 210.

Overview of Example Token Generation and Usage Techniques

Figure 3:
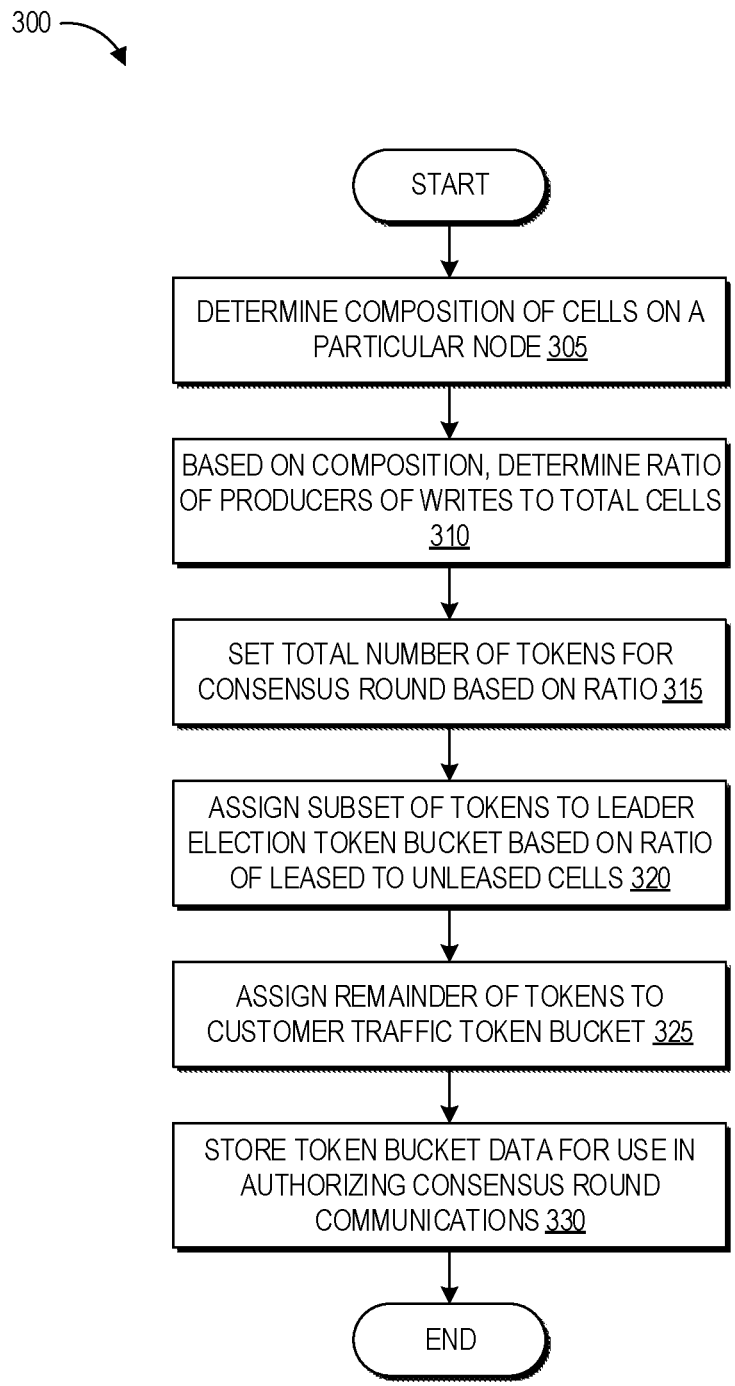
FIG. 3 depicts a flowchart of an example process for dynamically determining tokens for authorizing transactions in the distributed consensus computing system of FIGS. 1A and 1B.

FIG. 3 depicts a flowchart of an example process 300 for dynamically determining tokens for authorizing transactions in the distributed consensus computing system 100. The process 300 can be implemented by any of the nodes 120A-120Z of FIGS. 1A and 1B and the nodes N of FIG. 2. The process 300 may be performed on the fly for every transaction request in some implementations. In such implementations, the token bucket sizes will reflect the current composition of cells on the node, and a fixed transaction cost can be used. In various implementations, the process 300 may be performed in response to receiving a transaction request, or at predetermined time intervals, for example every 200 ms or 500 ms (or longer or shorter time intervals). In other implementations, fixed token bucket sizes can be used. In such implementations, at the time of receiving a given transaction request the token bucket sizes may not reflect the current composition of cells on the node. As such, the cost of each transaction can be dynamically computed based on the current composition. Some implementations can use a combination of dynamically computed token bucket sizes and dynamically determined costs. The process 300 can be performed by a processor of a node executing suitable computer-executable instructions.

At block 305, the node can determine the composition of cells stored on the node. The composition of cells refers to the identity of the cells stored on the node, which can be leased cells (e.g., leader cells, simple juror cells) or unleased cells that do not know their identity. The node may query data of each cell to identify its identity. In some implementations, the node can cache the cell compositions in a memory and can query the memory to determine the composition. Each time the composition changes the node can update the memory with the cached compositions. For example, the node composition can change when new cells are added or when the leadership status changes for a currently stored cell. In some implementations, the cache may be updated at each "heartbeat" by which a juror refreshes its lease, as described above.

At block 310, the node can determine the ratio of producers of writes (e.g., leaders and unleased cells) to the total cells currently stored on the node or to the maximum total cells capable of being stored on the node. For example, when all cells on a node are leaders, this ratio would be 1. At block 315, based on this ratio, at block 315 the node can set the total number of tokens for a consensus round (or a given time period, for example one second). Table 1 below reflects one example of the maximum allowed write transactions per second (TPS) for three different producer distributions on a node, labeled as control points CP1, CP2, and CP3. These control points represent three tested node distributions, and other node distributions that differ from these three tested control points can be extrapolated from these control points, for example using a cubic spline function using these three inputs. It will be appreciated that the particular numbers shown in Table 1 can vary within the scope of this disclosure, depending upon particular tested setups. Generally, the disclosed techniques can use any number of tested control points to extrapolate maximum write TPS for a given node during a given timeframe.

TABLE 1

| Control Points | CP1 | CP2 | CP3 |
| --- | --- | --- | --- |
| Total Cell count | 5250 | 5250 | 5250 |
| Producer count | 5250 | 750 | 0 |
| Max allowed write TPS | 185 | 123 | 10 |
| producerRatio (X) | 1 | 0.143 | 0 |
| WriteWeightage (Y) | 1 | 1.506 | 18.5 |

The total number of tokens determined at block 315 may not reflect the entire transaction bandwidth of a node. For example, some transaction bandwidth can be reserved for consensus transactions (e.g., PutItems and GetItems), a minimum reserved buffer, and other needed transactions. However, even if the node is not currently hosting the maximum number of cells that it is capable of hosting, the ratio of producers is still scaled to the maximum number of cells in order to utilize the available capacity of the node. This dynamic sizing is based on the performance testing of the extreme producer control point CP1 (which has all producers on a node), the median control point CP2 (which has all nodes with equally distributed producers), and the base control point CP3 (which has no producers on a node), one example of which is reflected in Table 1. In some implementations, rather than or in addition to using control points of pre-tested configurations, the total number of tokens may be determined based on a current amount or percentage of available resources (e.g., memory, processing, and/or networking) of the node. In such implementations, control points may be dynamically determined from among a set of control points based on resource usage. As an example, in these implementations when CPU usage is 90%, this can cause a reduction in the node limit bucket size compared to CPU usage of 10%.

At block 320, the node can assign a subset of the tokens to a leader election token bucket or set the size of the leader election token bucket based on a proportion of the total tokens corresponding to the ratio of unleased to leased cells. Some implementations may add additional tokens to the leader election token bucket based on a number of "open" cell slots, that is, a number of cells by which the current number of cells stored on the node is below the maximum cell capacity of the node. This may ensure that the leader election token bucket accounts for the potential addition of new cells to the node and the corresponding leader elections that may take place. The leader election token bucket can be drawn upon to authorize transactions relating to leader election. If a consensus group lacks a leader, it can be unable to respond to client requests. Assigning some of the overall tokens to a bucket specifically for leader election can ensure that customer traffic is not completely overwhelmed by leader election traffic, for example in a scenario where many consensus groups are trying to establish leadership. Also at block 320, the node may determine the size of the leader election burst token bucket, which may be the same size as the primary leader election token bucket (or a multiple thereof, depending upon the number of unleased cells and/or open cell slots).

At block 325, the node can assign at least a portion of remainder of the tokens to the customer traffic token bucket or set the size of the customer traffic token bucket. The portion may be determined by taking the inverse ratio as determined at block 320 and multiplying this by the total tokens. In some implementations, this may equal the remainder of the total tokens. However, in other implementations some tokens may remain of the total tokens after allotting a first portion to the leader election traffic and a second portion to the customer traffic. Assigning the customer traffic tokens can be done after deduction of the runtime value of the lease traffic. For example, if the node calculates that it expects and supports up to 50 transactions per section ("TPS") of leader election out of 200 TPS total, if there are actually 50 leader election requests, the customer traffic will get only 150 TPS. However, if it so happens that there are 0 leader election requests, the customer traffic will get the full 200 TPS. Beneficially, this enables the node to not reserve traffic or capacity that would be unused.

The customer traffic token bucket can be drawn upon to authorize transactions for handling client requests involving writes. Reserving some of the overall tokens to a bucket specifically for this traffic can ensure that write traffic (e.g., responsive to client requests) does not completely overwhelm leader election traffic, so that leaderless consensus groups can proceed with leader election. Although the process 300 is presented in the context of determining two token bucket sizes, one for leader election traffic and one for customer traffic, as described herein additional token buckets may be determined for additional types of traffic. These token buckets may be determined in an order based on a prioritization of the traffic, where such priority may vary depending upon the implementation. Also at block 320, the node may determine the size of the customer traffic burst token bucket, which may be the same size as the primary customer traffic token bucket.

At block 330, the node can store the token bucket data for use in authorizing consensus round communications. The node can store, for example, the number of total tokens assigned to each bucket, as well as a number of remaining tokens and data indicating where any granted tokens are currently in use. In some implementations the token buckets may only be used to authorize (or throttle) write transactions where writes are initiated, and thus can be considered as write transaction limits per timeframe.

Figure 4:
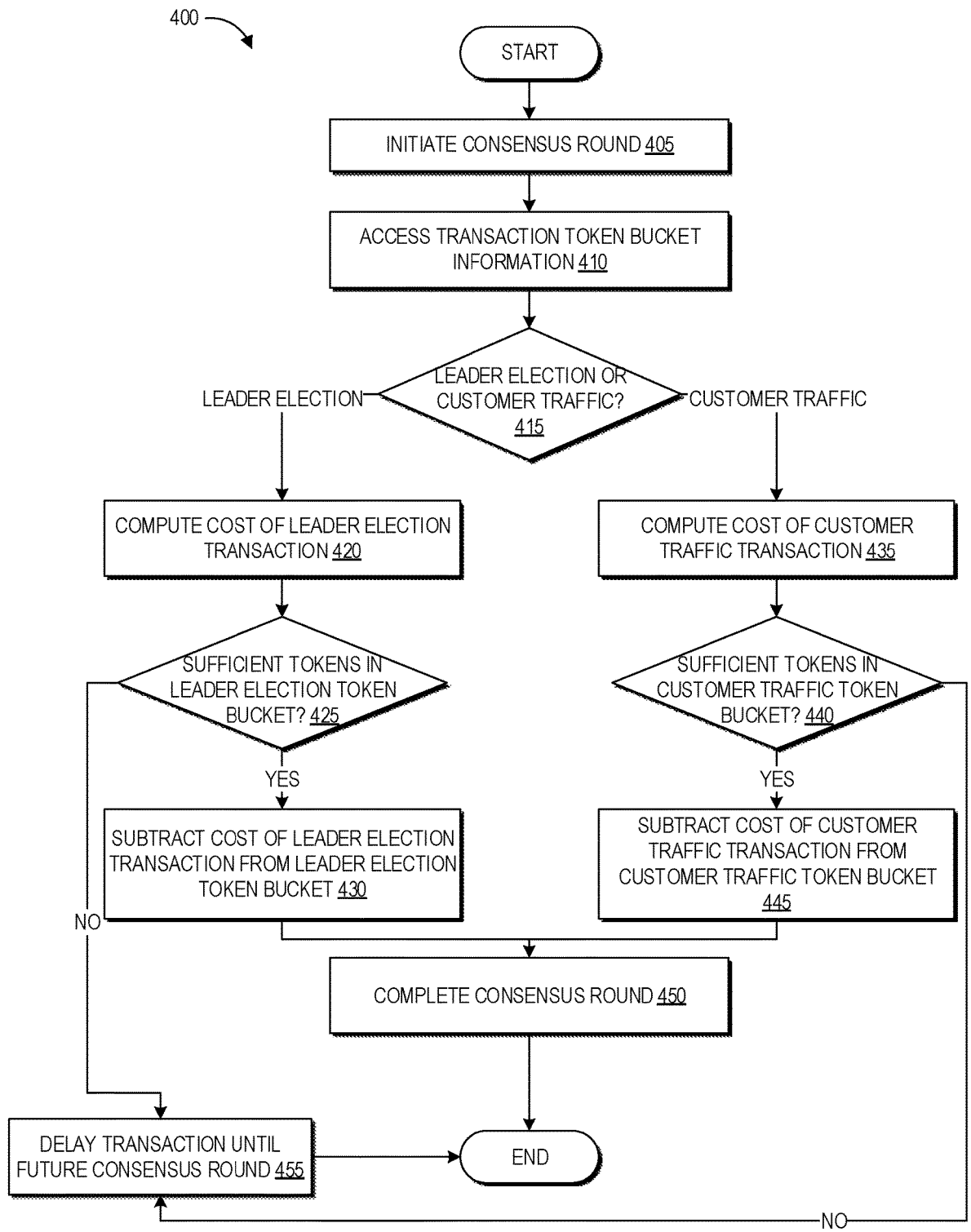
FIG. 4 depicts a flowchart of an example process for using tokens, determined according to the process of FIG. 3, for authorizing transactions in the distributed consensus computing system of FIGS. 1A and 1B.

FIG. 4 depicts a flowchart of an example process 400 for using tokens, determined according to the process of FIG. 3, for authorizing transactions in the distributed consensus computing system 100. The process 400 can be implemented by any of the nodes 120A-120Z of FIGS. 1A and 1B and the nodes N of FIG. 2. As the process 400 is executed, the leader election and customer traffic token buckets can be replenished to their determined amounts at predetermined time intervals that correspond to the time interval of the node transaction limit.

At block 405, the node can receive a transaction that may initiate a consensus round. The transaction can be leader election traffic, by which a consensus group attempts to establish a leader, or customer traffic, for example a request from the client 205 to handle one or more writes. At block 410, the node can access the transaction token bucket information stored at block 330 (together with any updates regarding current usage of tokens).

At block 415, the node can determine whether the particular transaction represents leader election or customer traffic, in order to identify which token bucket should be drawn upon to authorize the transaction. In some implementations, as described herein, there may be additional types of traffic and associated token buckets analyzed by the process 400. For example, the node may determine the origin of the traffic (a client or a particular cell), or may identify data associated with the transaction that indicates which type of transaction it is.

If the traffic is leader election traffic, the process 400 moves to block 420 to compute the cost of leader election traffic. The cost refers to the number of tokens required to authorize the transaction. In some implementations, this can be determined based on the following equation:

$$W_L = \text{TPS}m/(((\text{TPS}m/Y) - \text{TPS}r) * UPr + \text{TPS}r/2)$$

where $W_L$ represents the lease weightage (e.g., the cost of leader election traffic), TPSm represents the maximum customer and lease consensus transaction limit, Y represents the write weightage, TPSr represents a minimum reserved number of transactions, and UPr represents the unleased cell to producer ratio. TPSm may be determined by subtracting a reserved consensus traffic from a maximum consensus traffic limit. The write weightage Y may be determined by dividing TPSm by the maximum allowed write TPS determined at block 315. The particular values of such parameters can be varied based upon the desired implementation. Block 420 can beneficially enable the leader election transaction cost to account for current node parameters, for example when the token bucket sizes are computed on a fixed schedule rather than in response to individual transactions. In implementations that compute token bucket sizes on demand for each transaction, leader election traffic can instead have a fixed cost. It will be appreciated that changing the token bucket size can be logically equivalent to changing the transaction cost upon each request.

At block 425, the node determines whether there are sufficient tokens in the leader election token bucket to authorize the leader election transaction. If so, the process 400 moves to block 430 to subtract the determined cost of the leader election transaction from the leader election token bucket. Some implementations may draw the determined cost from both the leader election token bucket and the customer traffic token bucket for leader elections, so that the lade election does not starve customer traffic for other cells on the same node. From there, the process 400 proceeds to block 450 to complete the consensus round relating to the authorized transaction. The leader election tokens may be refilled at a steady rate, or can be returned to the leader election token bucket when the round has completed, depending upon the implementation.

If the node determines at block 425 that there are not sufficient tokens in the leader election token bucket to authorize the leader election transaction, the process 400 moves to block 455 to reject the transaction, which causes it to likely be re-attempted by the cell that initiated that transaction (or another cell, if the leader changes) during a future consensus round (or other time period). Some transactions may never be re-tried, for example if the data involved in the transaction becomes stale, depending upon the request of the client. This can be accomplished by sending an error message to the cell that initiated the transaction, which can prompt the cell to re-try the transaction during a next round or after a predetermined time period has elapsed.

If, at block 415, the node determines that the transaction represents customer traffic, the process 400 proceeds to block 435 to compute the cost of the customer traffic. In some implementations, this can be determined by dividing TPSm by the maximum allowed write TPS determined at block 315. Several examples of write weightage are shown in Table 1 above. Block 435 can beneficially enable the customer traffic transaction cost to account for current node parameters, for example when the token bucket sizes are computed on a fixed schedule rather than in response to individual transactions. In implementations that compute token bucket sizes on demand for each transaction, customer traffic can instead have a fixed cost. It will be appreciated that changing the token bucket size can be logically equivalent to changing the transaction cost upon each request.

At block 440, the node determines whether there are sufficient tokens in the customer traffic token bucket to authorize the customer traffic transaction. If so, the process 400 moves to block 445 to subtract the determined cost of the customer traffic transaction from the customer traffic token bucket. From there, the process 400 proceeds to block 450 to complete the consensus round relating to the authorized transaction. The customer traffic tokens may be refilled at a steady rate, or can be returned to the customer traffic token bucket when the round has completed, depending upon the implementation.

If the node determines at block 425 that there are not sufficient tokens in the leader election token bucket to authorize the leader election transaction, the process 400 moves to block 455 to delay the transaction until a future consensus round (or other time period). This can be accomplished by sending an error message to the cell that initiated the transaction, which can prompt the cell to re-try the transaction during a next round or after a predetermined time period has elapsed.

In some implementations, blocks 435-445 may only apply to limit the initiation of Paxos rounds by leader cells, and not the response to a Paxos round initiation by a simple juror cell. Thus, the customer traffic token bucket can be considered as a write initiation token bucket that authorizes write transactions that represent an initiation of a write. If a simple juror required a token to respond to a write transaction but no tokens were available, this may contribute to bandwidth congestion of other nodes by having to repeat the write transaction request to the simple juror until it had an available token. Beneficially, this technique of only using the customer traffic tokens to limit initiation of write transactions can leave simple jurors free to respond to proposals without tokens.

As described above, some implementations may also maintain a node limit token bucket reflecting the total determined number of transaction tokens available for the node, in order to ensure that the node does not become overwhelmed by accommodating bursts in particular types of traffic. In such implementations, blocks 430 and 445 can additionally involve drawing the determined number of tokens from this node limit token bucket. A rejection either from its traffic-specific token bucket or the node limit token bucket may cause the transaction to be rejected.

As such, the process 400 represents a token-based technique for throttling transactions to node limits dynamically determined based on cell composition, in order to balance both leader election traffic and customer traffic. Although not shown in FIG. 4, as described above some implementations may allow a node to temporarily exceed its transaction limits by using a "burst" token bucket that is then replenished during a next timeframe or timeframes.

Overview of Example Replication Server

Figure 5:
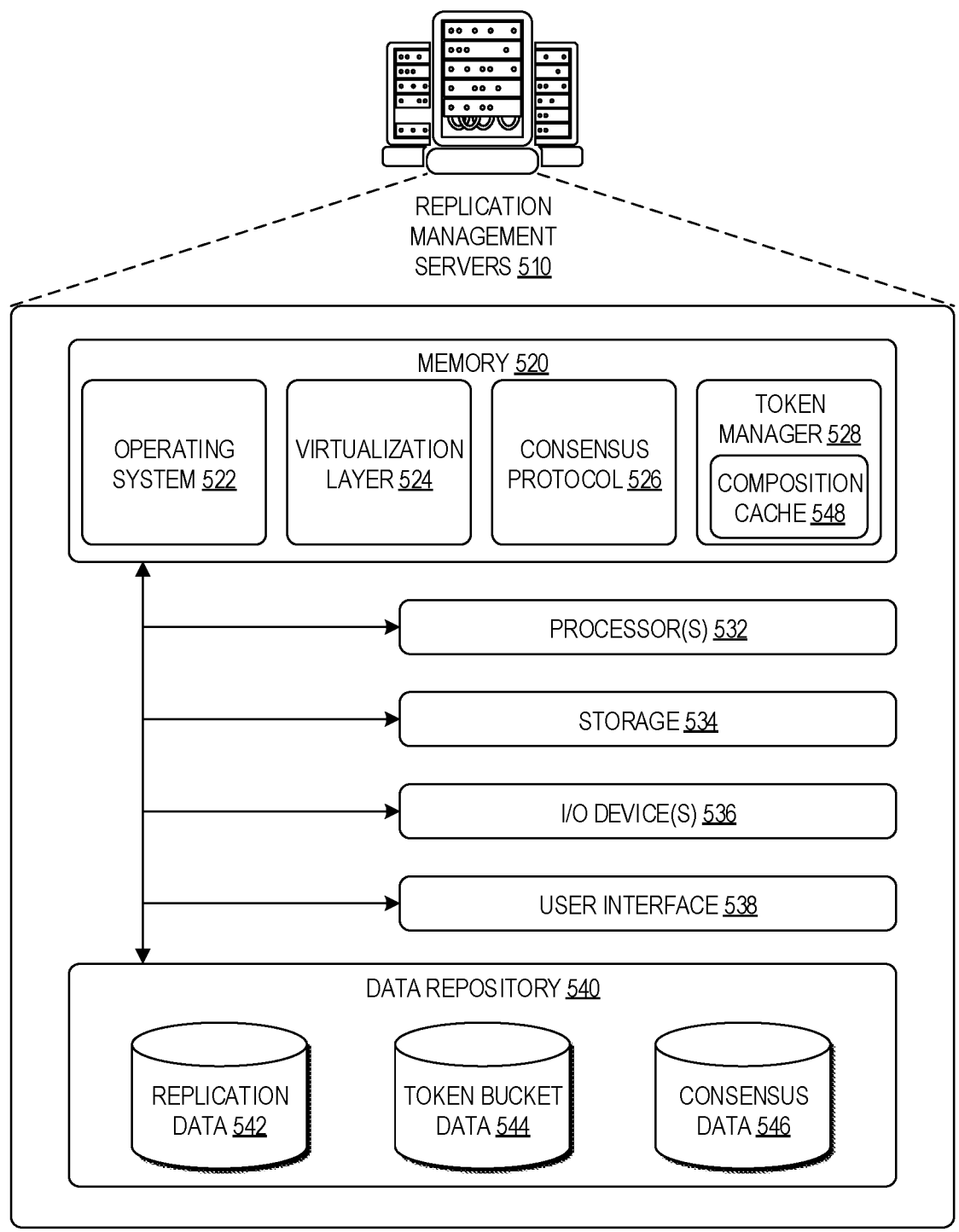
FIG. 5 depicts a schematic diagram of an example server system hosting a portion of the distributed consensus computing system of FIGS. 1A and 1B.

FIG. 5 depicts a schematic diagram of example replication management servers 510 hosting a portion of the distributed consensus computing system 100. A number of such replication management servers 510 can be in network communication with one another to form the consensus groups 110A-110N. The replication management servers 510 may include one or more computers, perhaps arranged in a cluster of servers or as a server farm. The memory and processors that make up these computers may be located within one computer or distributed throughout many computers (including computers that are remote from one another) as detailed herein. Example components of one such replication management server 510 is shown in FIG. 5.

The replication management server 510 may include at least one memory 520 and one or more processing units (or processor(s)) 532. The memory 520 may include more than one memory and may be distributed throughout the replication management server 510. The memory 520 may store program instructions that are loadable and executable on the processor(s) 532 as well as data generated during the execution of these programs. Depending on the configuration and type of memory, the memory 520 may be volatile (such as random access memory ("RAM")) and/or non-volatile (such as read-only memory ("ROM"), flash memory, or other memory). In some examples, the memory 520 may include multiple different types of memory, such as static random access memory ("SRAM"), dynamic random access memory ("DRAM"), or ROM.

The memory 520 can store the program instructions as a number of modules that configure processor(s) 532 to perform the various functions described herein, for example operating system 522 for interacting with the computing system 200, as well as the virtualization layer 524, consensus protocol 526, and token manager 528, which can be in direct communication with one another or distributed among computing devices within a networked computing system and in communication with each other. The configuration of the consensus protocol 526 is described in more detail with respect to FIGS. 1 and 2, and the configuration of the token manager 528 is described in more detail with respect to FIGS. 3 and 4. The token manager 528 can include the composition cache 548 storing data representing the current (and potentially previous) composition of cells on the node. In alternative embodiments the composition cache 548 may instead by stored in the data repository 540.

The virtualization layer 524 can be a container of a database structure stored on one or more physical memories. In other implementations, the virtualization layer 524 may include a bare metal hypervisor or a hosted hypervisor. The virtualization layer 524 executing on the replication management server 510 enables the physical hardware to be used to provide computational resources upon which one or more consensus groups and/or component thereof such as a node as described above may operate. For example, the virtualization layer 524 may enable a particular node of a consensus group to access physical hardware on the replication management server 510 through virtual device drivers or other executable code on the node. The virtualization layer 524 may include a hypervisor or virtualization software and/or hardware. The virtualization layer 524 may also include an instance of the operating system 522 dedicated to administering the consensus group or component thereof running on the replication management server 510. In some implementations, multiple virtualization layers 524 can run on the replication management servers 510, for example one on each server or one per a certain number of consensus groups. Each virtualization layer 524 may include its own networking software stack, responsible for communication with other virtualization layers 524 and, at least in some embodiments, also responsible for implementing network connectivity between the consensus group or components thereof running on the replication management server 510 and other consensus groups running on other replication management servers 510.

The processor 532 may include one or more general purpose computers, dedicated microprocessors, graphics processors, or other processing devices capable of communicating electronic information. Examples of the processor 532 include one or more application-specific integrated circuits ("ASICs"), graphical processing units ("GPUs"), field programmable gate arrays ("FPGAs"), digital signal processors ("DSPs") and any other suitable specific or general purpose processors. The processor 532 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the replication management server 510 may also include additional storage 534, which may include removable storage and/or non-removable storage. The additional storage 534 may include, but is not limited to, magnetic storage, optical disks, and/or solid-state storage. The disk drives and their associated computer-readable media may provide non-volatile storage of computer-readable instructions, data structures, program modules, and other data for the computing devices. The memory 520 and the additional storage 534, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture.

The replication management server 510 may also include input/output (I/O) device(s) and/or ports 536, such as for enabling connection with a keyboard, a mouse, a pen, a voice input device, a touch input device, a display, speakers, a printer, or other I/O device. The replication management server 510 may also include a user interface 538. The user interface 538 may be utilized by a user to access portions of the distributed consensus computing system 110. In some examples, the user interface 538 may include a graphical user interface, web-based applications, programmatic interfaces such as application programming interfaces (APIs), or other user interface configurations. The user interface 538 can include displays of the token assignments and usages as described herein. In some embodiments, the 110 device(s) and/or ports 536 and user interface 538 can be part of a user computing device accessing the replication management server 510 via a network.

The replication management server 510 also includes a data store 540. In some examples, the data store 540 may include one or more data stores, databases, data structures, or the like for storing and/or retaining information associated with the distributed consensus computing system 110. Thus, the data store 540 may include data structures, such as replication data repository 542, token bucket data repository 544, and consensus data repository 546. The replication data repository 542 comprises one or more physical data storage devices that stores data representing the different consensus groups, for example indicating which nodes are part of a given consensus group, as well as identifying the nodes and their placement within the consensus computing system 110. The token bucket data repository 544 comprises one or more physical data storage devices that stores data representing, per node, the determined numbers of tokens per bucket, as well as how many tokens are in use/remaining. Although shown in the data repository 540, which may in some implementations represent disk storage, the token bucket data repository 544 may be maintained in the memory 520 in some implementations, together with the composition cache 548. The token consensus data repository 546 comprises one or more physical data storage devices that stores data representing communications and outcomes of consensus rounds.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes may begin in response to an event, such as on a predetermined or dynamically determined schedule, on demand when initiated by a user or system administer, or in response to some other event. When the process is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method of managing write transactions on a node in communication with a distributed consensus system and configured to store cells of consensus groups of the distributed consensus system, the node including a plurality of cells, wherein individual cells are one of a leased cell that knows its identity in a particular one of the consensus groups or an unleased cell that does not know its identity in a particular one of the consensus groups, wherein the identity is one of a leader or a non-leader juror in a particular one of the consensus groups, the computer-implemented method comprising:

determining a proportion of producers of writes stored on the node to a maximum cell capacity of the node, wherein producers of writes include, from among the plurality of cells stored on the node, cells who know their identity as leaders and unleased cells that do not know their identity;

determining a write transaction limit for the node based at least partly on the proportion, wherein the write transaction limit specifies a number of write transactions per time interval that the node is permitted to perform, and wherein the determined write transaction limit increases as the proportion increases and decreases as the proportion decreases; and authorizing or reject a write transaction request based on the write transaction limit.

2. The computer-implemented method of claim 1, wherein the write transaction limit is represented by a number of tokens equal to a number of transactions presently permitted according to the write transaction limit, and wherein authorizing or reject the write transaction request based on the write transaction limit comprises authorizing the write transaction request based on determining that at least one token of the number of tokens is unused.

3. The computer-implemented method of claim 2 further comprising:
assigning a first portion of the number of tokens to leader election traffic based at least partially on a ratio of leased cells to unleased cells within the plurality of cells; and
assigning a second portion of the number of tokens to customer traffic.

4. The computer-implemented method of claim 3 further comprising assigning a third portion of the number of tokens to burst traffic, wherein sizes of the second portion and the third portion are determined based on a remainder of the number of tokens after subtracting the first portion from the number of tokens.

5. The computer-implemented method of claim 4, wherein authorizing or reject the write transaction request based on the write transaction limit comprises:
determining that a cost of the write transaction request exceeds a remaining amount of tokens within the second portion;
drawing an amount of tokens from the third portion to authorize the write transaction request; and
reducing a number of tokens added to the second portion during a subsequent time cycle to replenish tokens within the third portion.

6. The computer-implemented method of claim 5 further comprising, at predetermined time intervals, adding tokens to the first and second portions.

7. Non-transitory computer-readable media comprising computer-executable instructions for managing write transactions on a node in communication with a distributed consensus system and configured to store cells of consensus groups of the distributed consensus system, the node including a plurality of cells, wherein individual cells are one of a leased cell that knows its identity in a particular one of the consensus groups or an unleased cell that does not know its identity in a particular one of the consensus groups, wherein the identity is one of a leader or a non-leader juror in a particular one of the consensus groups, and wherein the instructions, when executed by a computing system, cause the computing system to:
determine a proportion of producers of writes stored on the node to a maximum cell capacity of the node, wherein producers of writes include, from among the plurality of cells stored on the node, cells who know their identity as leaders and unleased cells that do not know their identity;
determine a write transaction limit for the node based at least partly on the proportion, wherein the write transaction limit specifies a number of write transactions per time interval that the node is permitted to perform, and wherein the determined write transaction limit increases as the proportion increases and decreases as the proportion decreases; and
authorize or reject a write transaction request based on the write transaction limit.

8. The non-transitory computer-readable media of claim 7, wherein the write transaction limit is represented by a number of tokens within a token bucket, the number of tokens being equal to a number of transactions presently permitted according to the write transaction limit, and wherein authorizing or reject the write transaction request based on the write transaction limit comprises rejecting the write transaction request based on determining that the number of tokens remaining within the token bucket is less than a cost of a write transaction requested in the write transaction request.

9. The non-transitory computer-readable media of claim 7, wherein the write transaction limit is represented by a number of tokens within a token bucket, the number of tokens being equal to a number of transactions presently permitted according to the write transaction limit, and wherein the instructions further cause the computing system to divide the token bucket into a first subbucket representing a transaction limit for leader election traffic and a second subbucket representing a transaction limit for client traffic.

10. The non-transitory computer-readable media of claim 9, wherein authorizing or reject the write transaction request based on the write transaction limit comprises rejecting the write transaction request based on determining that the number of tokens remaining within the second subbucket is less than a cost of a write transaction requested in the write transaction request.

11. A system comprising:
a node in communication with a distributed consensus system, wherein the node corresponds to an individual computing device configured to store cells of consensus groups of the distributed consensus system, each of the consensus groups comprising a group of cells distributed across multiple nodes of the distributed consensus system;
a plurality of cells stored on the node, wherein individual ones of the cells are one of a leased cell that knows its identity in a particular one of the consensus groups or an unleased cell that does not know its identity in a particular one of the consensus groups, wherein the identity is one of a leader or a non-leader juror in a particular one of the consensus groups; and
one or more processors configured by computer-executable instructions to at least:
determine a proportion of producers of writes stored on the node to the maximum cell capacity of the node, wherein producers of writes include, from among the plurality of cells stored on the node, cells who know their identity as leaders and unleased cells that do not know their identity;
determine a write transaction limit for the node based at least partly on the proportion, wherein the write transaction limit specifies a number of write transactions per time interval that the node is permitted to perform, and wherein the determined write transaction limit increases as the proportion increases and decreases as the proportion decreases; and
authorize or reject a write transaction request based on the write transaction limit.

12. The system of claim 11, wherein the node is currently storing a number of the cells of consensus groups of the distributed consensus system that is less than the maximum cell capacity, and wherein the one or more processors are further configured by the computer-executable instructions to determine the write transaction limit based at least partly on a difference between the maximum cell capacity and the number of the cells.

13. The system of claim 11, wherein the node is currently storing a number of the cells of consensus groups of the distributed consensus system, and wherein the one or more processors are further configured by the computer-executable instructions to determine the write transaction limit based at least partly on a proportion of the number of the producers of writes to the number of the cells.

14. The system of claim 11, wherein the one or more processors are further configured by the computer-executable instructions to:
    assign a first portion of the write transaction limit to leader election traffic; and
    assign a second portion of the write transaction limit to customer traffic.

15. The system of claim 14, wherein the one or more processors are further configured by the computer-executable instructions to authorize the write transaction based on determining that a cost of the write transaction does not exceed an available capacity of a determined one of either the first portion or the second portion in a given time interval.

16. The system of claim 14, wherein the one or more processors are further configured by the computer-executable instructions to reject the write transaction based on determining that a cost of the write transaction exceeds an available capacity of either the first portion or the second portion in a given time interval.

17. The system of claim 14, wherein the one or more processors are further configured by the computer-executable instructions to:
    determine whether the write transaction represents leader election traffic or customer traffic; and
    determine whether to deduct a cost of the write transaction from the first portion or the second portion based on whether the write transaction represents the leader election traffic or the customer traffic.

18. The system of claim 11, wherein the one or more processors are further configured by the computer-executable instructions to:
    determine that a cost of the write transaction exceeds a corresponding portion of the write transaction limit; and
    authorize the write transaction by drawing at least one token from a burst token bucket.

19. The system of claim 11, wherein the node comprises a cache memory, wherein the one or more processors are further configured by the computer-executable instructions to update the cache memory with a current composition of the plurality of cells stored on the node in response to at least one of the plurality of cells executing a heartbeat protocol.

* * * * *